United States Patent
Yun et al.

(10) Patent No.: US 8,917,258 B2
(45) Date of Patent: Dec. 23, 2014

(54) TOUCH SCREEN APPARATUS

(75) Inventors: Young-jun Yun, Seongnam-si (KR);
Jung-woo Kim, Hwaseong-si (KR);
Myoung-hoon Jung, Seoul (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 97 days.

(21) Appl. No.: 13/611,666

(22) Filed: Sep. 12, 2012

(65) Prior Publication Data

US 2013/0181917 A1    Jul. 18, 2013

(30) Foreign Application Priority Data

Jan. 18, 2012   (KR) .......................... 10-2012-0005841

(51) Int. Cl.
*G06F 3/045*    (2006.01)
(52) U.S. Cl.
USPC .......................................... 345/174; 345/173
(58) Field of Classification Search
USPC ................................................. 345/173, 174
See application file for complete search history.

(56) References Cited

U.S. PATENT DOCUMENTS

| | | |
|---|---|---|
| 2003/0020684 A1 | 1/2003 | Edwards et al. |
| 2003/0122790 A1* | 7/2003 | Sharma .......................... 345/173 |
| 2011/0069036 A1* | 3/2011 | Anno .............................. 345/174 |
| 2012/0242634 A1* | 9/2012 | Maruyama et al. ........... 345/207 |
| 2013/0002600 A1* | 1/2013 | McCracken ................... 345/174 |

FOREIGN PATENT DOCUMENTS

| | | |
|---|---|---|
| JP | 2005-049978 A | 2/2005 |
| KR | 10-2000-0039893 A | 7/2000 |
| KR | 100931365 B1 | 12/2009 |

* cited by examiner

*Primary Examiner* — Lixi C Simpson
(74) *Attorney, Agent, or Firm* — Harness, Dickey & Pierce, P.L.C.

(57) ABSTRACT

A touch screen apparatus including: a touch sensing unit; a memory configured to store sensing information transmitted from the touch sensing unit; and a display unit associated with the memory, the display unit configured to receive and display the sensing information stored in the memory.

17 Claims, 3 Drawing Sheets

TOUCH SCREEN APPARATUS

CROSS-REFERENCE TO RELATED APPLICATIONS

This application claims the benefit of Korean Patent Application No. 10-2012-0005841, filed on Jan. 18, 2012, in the Korean Intellectual Property Office, the disclosure of which is incorporated herein in its entirety by reference.

BACKGROUND

1. Field

The present disclosure relates to touch screen apparatuses, and more particularly, to touch screen apparatuses which are capable of operating at a high-speed.

2. Description of the Related Art

A touch screen is a device through which input data is directly received via a screen such that a touch by a person or by a pen on a desired (or, alternatively a predetermined) position of a display screen is detected to be processed by software. To this end, a touch screen is formed by attaching a touch panel to a display panel to implement the above function. Examples of the touch panels are pressure type, resistive type, touch electrostatic capacitive type, surface acoustic wave (SAW) type, infrared detection type, and piezoelectric type touch panels. Recently, touch screens are widely used in various fields as input devices for replacing a keyboard or a mouse.

In a touch screen apparatus, a method of directly touching a screen of a display apparatus by hand or using a pen is generally used. Thus, speed and display of fast touch sensing are increasingly demanded for, for example, pen writing on the touch screen apparatus.

SUMMARY

Provided are touch screen apparatuses improved to have a faster response speed so as to provide a high-speed touch sensing operations and to process multiple touches.

Additional aspects will be set forth in part in the description which follows and, in part, will be apparent from the description, or may be learned by practice of the presented embodiments.

According to an example embodiment, a touch screen apparatus includes: a touch sensing unit; at least one memory configured to store sensing information transmitted from the touch sensing unit; and a display unit associated with the memory, the display unit configured to receive and display the sensing information stored in the memory.

The display unit may include: a display area; and a touch switch configured to selectively transmit the sensing information stored in the memory to the display area.

The touch switch may be a switch transistor and the memory is connected to a gate of the touch switch.

The touch screen apparatus may further include a readout switch configured to selectively transmit the sensing information stored in the memory directly to a readout line.

The readout switch may be a switch transistor and the memory is connected to a source of the readout switch.

The display unit may further include a pixel switch configured to selectively transmit a data signal to the display area.

The touch sensing unit may be configured to sense a change in impedance between first and second electrodes.

The memory may be configured to receive a signal indicating the change in impedance from the first and second electrodes and store signal as a trigger.

One of the first and second electrodes may be a common electrode and is configured to supply a same signal to a plurality of pixels.

A plurality of pixels may be arranged in a two-dimensional arrangement, and each pixel may include the memory and the associated display unit.

A common electrode may be configured to supply the same signal to the plurality of pixels, the plurality of pixels may be configured to respond to the same signal at a same time.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
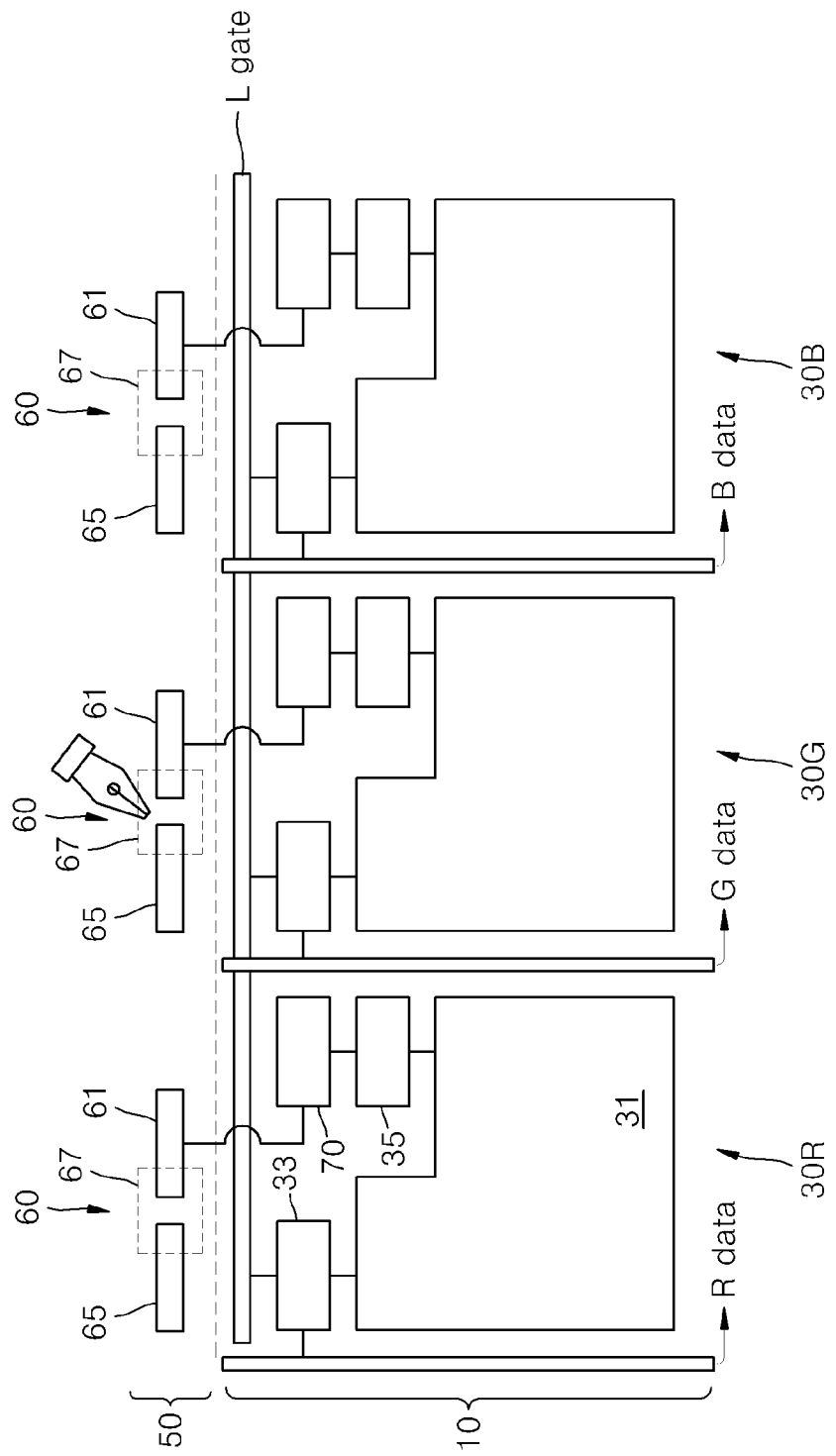
FIG. 1 is a schematic diagram of a structure of a touch screen apparatus according to an example embodiment.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments of the invention are shown. In the drawings, the thicknesses of layers and regions are exaggerated for clarity. In this regard, the present embodiments may have different forms and should not be construed as being limited to the descriptions set forth herein. Accordingly, the embodiments are merely described below, by referring to the figures, to explain aspects of the present description.

FIG. 1 is a schematic diagram of a structure of a touch screen apparatus according to an example embodiment.

Referring to FIGS. 1-4, the touch screen apparatus according to an example embodiment may include a touch sensing unit 60, a memory 70, and display units 30R, 30G, and 30B. The touch sensing unit 60 may be formed in the touch panel 50, and the display units 30R, 30G, and 30B may be arranged in a display panel 10.

Figure 4:
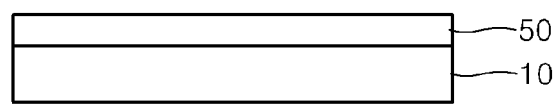
FIG. 4 is a schematic view of a stacking structure of a touch screen apparatus according to an example embodiment.

The touch screen apparatus may have a structure in which the touch panel 50 is disposed on the display panel 10 as illustrated in FIG. 4. A memory 70 may be formed in the touch panel 50 or in the display panel 10. Also, the memory 70 may be formed in an additional layer between the display panel 10 and the touch panel 50. Referring to FIG. 1, the memory 70 may be disposed in the display panel 10.

The display units 30R, 30G, and 30B of FIG. 1 may be arranged in a two-dimensional arrangement in the display panel 10. When the display panel 10 is formed to display colors, the display units 30R, 30G, and 30B of FIG. 1 correspond to a pixel of the display panel 10. That is, the three display units—the display unit 30R for displaying a red color, the display unit 30G for displaying a green color, and the display unit 30B for displaying a blue color—form a pixel, and each of the display units 30R, 30G, and 30B corresponds to a sub-pixel. When the display panel 10 is formed to display one color, the display units 30R, 30G, and 30B each correspond to a single pixel. When displaying touch sensing information input via the touch panel 50, each of the display units 30R, 30G, and 30B may correspond to a pixel.

The touch sensing unit 60 of FIG. 1 may be formed in a two-dimensional arrangement in the touch panel 50. The two-dimensional arrangement of the touch sensing unit 60 may be formed to correspond to the two-dimensional arrangement of the display units 30R, 30G, and 30B formed in the display panel 10. A material area that generates an electromagnetic change according to a touch may be formed in the touch panel 50 to sense the touch when the touch panel 50 is touched by, for example, hand or by using a pen; for example, a piezoelectric resistive material area may be formed for a resistive type. In addition, an electrode allowing sensing of a touch may be formed.

Figure 2:
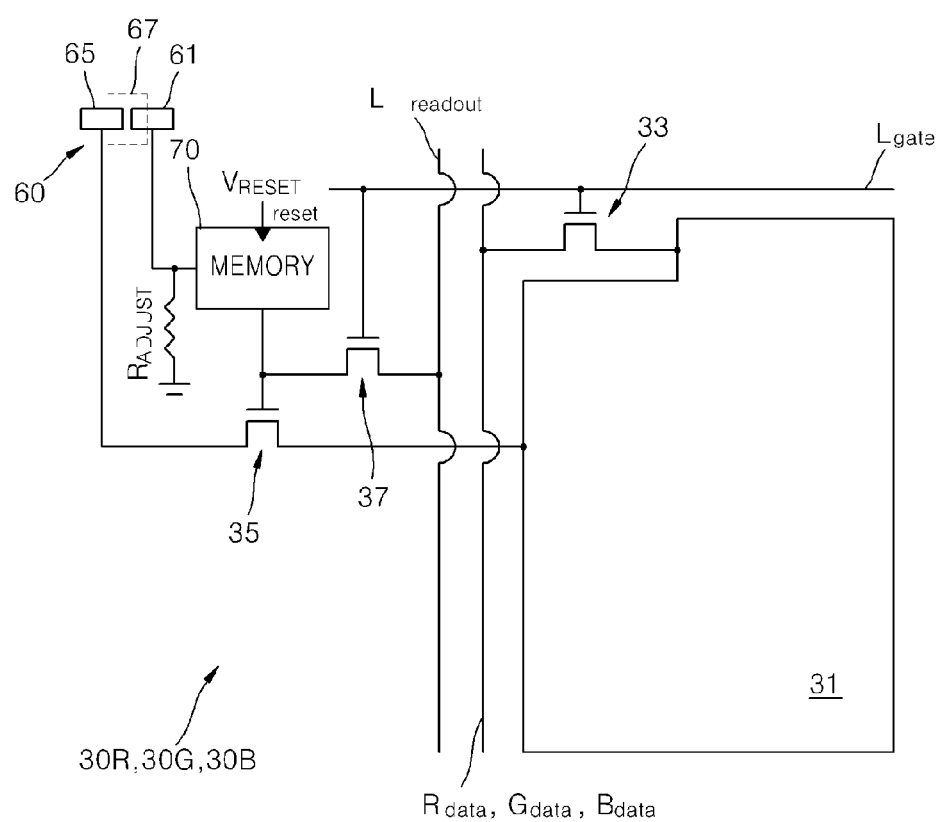
FIG. 2 is a circuit diagram of a pixel circuit of a touch screen apparatus according to an example embodiment.
Figure 3:
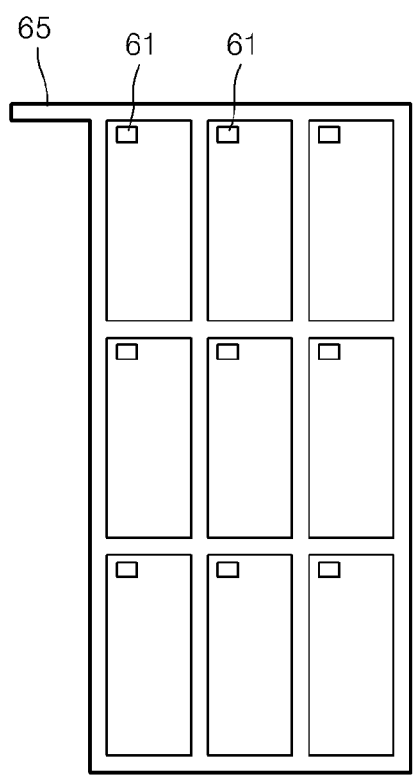
FIG. 3 is a schematic view of an electrode layout of a touch screen apparatus according to an example embodiment.

For example, first and second electrodes 61 and 65 may be formed in the touch sensing unit 60 of the touch panel 50 as illustrated in FIGS. 1 through 3. The first and second electrodes 61 and 65 may be formed of transparent electrodes. When the touch panel 50 is touched by hand or by using an instrument such as a pen, sensing information is generated in the touch sensing unit 60 which is disposed in a portion to be touched is positioned. The touch sensing unit 60 senses an electric or magnetic change between the first and second electrodes 61 and 65 and stores the sensing information in the memory 70.

When the touch panel 50 is a resistive type, for example, a piezoelectric resistive material area 67 may be formed over the first and second electrodes 61 and 65. When a touch occurs, the touch sensing unit 60 senses a change in impedance between the first and second electrodes 61 and 65. One of the first and second electrodes 61 and 65, for example, the second electrode 65, may be formed as a common electrode so as to supply the same signal to a plurality of pixels. In this case, all pixels may be individually operated at the same time.

A sensing information signal generated in the touch sensing unit 60 is input to and stored in the memory 70. The first electrode 61 may be connected to the memory 70 and configured to send the sensing information signal to the memory 70. A resistor Radjust may be connected between the first electrode 61 and the memory 70. The memory 70 may be formed to receive a signal input via the first and second electrodes 61 and 65 as a trigger and to store a change. The memory 70 may be formed to maintain information that is input, until a reset signal Vreset is input.

The display units 30R, 30G, and 30B receive sensing information stored in the memory 70 and display the same. To this end, the display units 30R, 30G, and 30B each include a display area 31 where input information is displayed and a touch switch 35 through which the sensing information stored in the memory 70 is transmitted to the display area 31. The touch switch 35 may be a switch transistor and is used to determine whether to transmit the sensing information stored in the memory 70 to the display area 31.

FIG. 2 is a circuit diagram of a pixel circuit of a touch screen apparatus according to an example embodiment.

Referring to FIG. 2, the memory 70 may be connected to a gate of the touch switch 35. The common electrode, that is, the second electrode 65 may be connected to a source of the touch switch 35 in order that the same signal is supplied to a plurality of pixels and all of the pixels may individually operate at the same time. A drain of the touch switch 35 may be connected to the display area 31.

In the touch screen apparatus according to an example embodiment, each of the display units 30R, 30G, and 30B may further include a pixel switch 33 so as to display not only the information stored in the memory 70 but also information input via data lines Rdata, Gdata, and Bdata. The pixel switch 33 may be a switch transistor, and the data lines Rdata, Gdata, and Bdata are connected to a source of the pixel switch 33, and a gate line Lgate may be connected to a gate of the pixel switch 33.

A signal for displaying a red (R) color image, a signal for displaying a green (G) color image, and a signal for displaying a blue (B) color image are input to the display area 31 of each of the display units 30R, 30G, and 30B via the pixel switch 33 from the data lines Rdata, Gdata, and Bdata.

When the pixel switch 33 is further included in addition to the touch switch 35, the display units 30R, 30G, and 30B may respectively display information input via the data lines Rdata, Gdata, and Bdata and touch information input from the memory 70 at the same time.

According to an example embodiment, a readout switch 37 may be further included as illustrated in FIG. 2 so as to immediately readout a signal stored in the memory 70. In FIG. 1, the readout switch 37 is omitted for clarity of illustration. The readout switch 37 may be a switch transistor; when a signal is input via a gate line Lgate, in order to immediately read a signal stored in the memory 70, the memory 70 may be connected to a source of the readout switch 37, and a gate of the readout switch 37 may be connected to the gate line Lgate. To output information read using the readout switch 37, a readout signal line Lreadout may be connected to a drain of the readout switch 37.

The touch screen apparatus according to an example embodiment may have a two-dimensional arrangement of a plurality of pixels, and each pixel or sub-pixel may have a circuit structure as illustrated in FIG. 2. In the touch screen apparatus according to an example embodiment, sensing information of the touch sensing unit 60 may be stored in the memory 70 for each pixel or sub-pixel, and the stored sensing information may be input to the display units 30R, 30G, and 30B.

As described above, according to the one or more of the above example embodiments, as the memory 70 is included in each pixel or sub-pixel, touch information may be displayed on a plurality of pixels at the same time, and thus a high-speed operation may be performed due to a faster response speed. That is, touch sensing information is not read by scanning but information stored in the memory 70 may be immediately displayed by interfacing the information with digital information via internal signal processing. Thus, when performing a touching operation such as pen-writing, fast responding may be possible. In addition, by including the second electrode 65 as a common electrode, various pixels may simultaneously respond to an access of an external instrument (e.g., a pen, hand, or any material such as a metal or insulating material that causes an electro or magnetic change). Accordingly, multiple touches may be processed at a high speed.

According to one or more example embodiments, sensing information obtained from a touch panel may be stored in memories provided for each pixel or each sub-pixel, and the sensing information stored in the memories may be received to display the same for each pixel or each sub-pixel. Thus, as the information may be simultaneously displayed without scanning, a fast response speed may be obtained, and this enables high-speed touch sensing. In addition, the sensing information may be displayed for each pixel, and thus multiple touches may be processed.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A touch screen apparatus comprising:
   a touch sensing unit;
   at least one memory configured to store sensing information transmitted from the touch sensing unit;
   a display unit associated with the memory, the display unit configured to display the sensing information stored in the memory, the display unit including a display area and a touch switch configured to selectively transmit the sensing information stored in the memory to the display area; and
   a readout switch configured to selectively transmit the sensing information stored in the memory to a readout line.

2. The touch screen apparatus of claim 1, wherein the touch switch is a switch transistor and the memory is connected to a gate of the touch switch.

3. The touch screen apparatus of claim 1, wherein the display unit further comprises: a pixel switch configured to selectively transmit a data signal to the display area.

4. The touch screen apparatus of claim 1, wherein the touch sensing unit is configured to sense a change in impedance between first and second electrodes.

5. The touch screen apparatus of claim 4, wherein the memory is configured to receive a signal indicating the change in impedance from the first and second electrodes and store the change in impedance as the sensing information.

6. The touch screen apparatus of claim 4, wherein one of the first and second electrodes is a common electrode and is configured to supply a same signal to a plurality of pixels.

7. The touch screen apparatus of claim 4, wherein a plurality of pixels are arranged in a two-dimensional arrangement, and each pixel includes the memory and the associated display unit.

8. The touch screen apparatus of claim 7, wherein a common electrode is configured to supply a same signal to the plurality of pixels such that the plurality of pixels are configured to respond to the signal at a same time.

9. The touch screen apparatus of claim 3, wherein a plurality of pixels are arranged in a two-dimensional arrangement, and each pixel includes the memory and the associated display unit.

10. The touch screen apparatus of claim 9, wherein a common electrode is configured to supply a same signal to the plurality of pixels, and the plurality of pixels are configured to respond to the same signal at a same time.

11. The touch screen apparatus of claim 1, wherein a plurality of pixels are arranged in a two-dimensional arrangement, and each pixel includes the memory and the associated display unit.

12. The touch screen apparatus of claim 11, wherein a common electrode is configured to supply a same signal to the plurality of pixels, and the plurality of pixels are configured to respond to the same signal at a same time.

13. The touch screen apparatus of claim 1, wherein a plurality of pixels are arranged in a two-dimensional arrangement, and each pixel includes the memory and the associated display unit.

14. The touch screen apparatus of claim 13, wherein a common electrode is configured to supply a same signal to the plurality of pixels, and the plurality of pixels are configured to respond to the same signal at a same time.

15. The touch screen apparatus of claim 1, wherein a plurality of pixels are arranged in a two-dimensional arrangement, and each pixel includes the memory and the associated display unit.

16. The touch screen apparatus of claim 15, wherein a common electrode is configured to supply a same signal to the plurality of pixels, and the plurality of pixels are configured to respond to the same signal at a same time.

17. A touch screen apparatus comprising:
   a touch sensing unit;
   at least one memory configured to store sensing information transmitted from the touch sensing unit;
   a display unit associated with the memory, the display unit configured to display the sensing information stored in the memory; and
   a readout switch configured to selectively transmit the sensing information stored in the memory to a readout line, wherein the readout switch is a switch transistor and the memory is connected to a source of the readout switch.

* * * * *